Patented Feb. 8, 1938

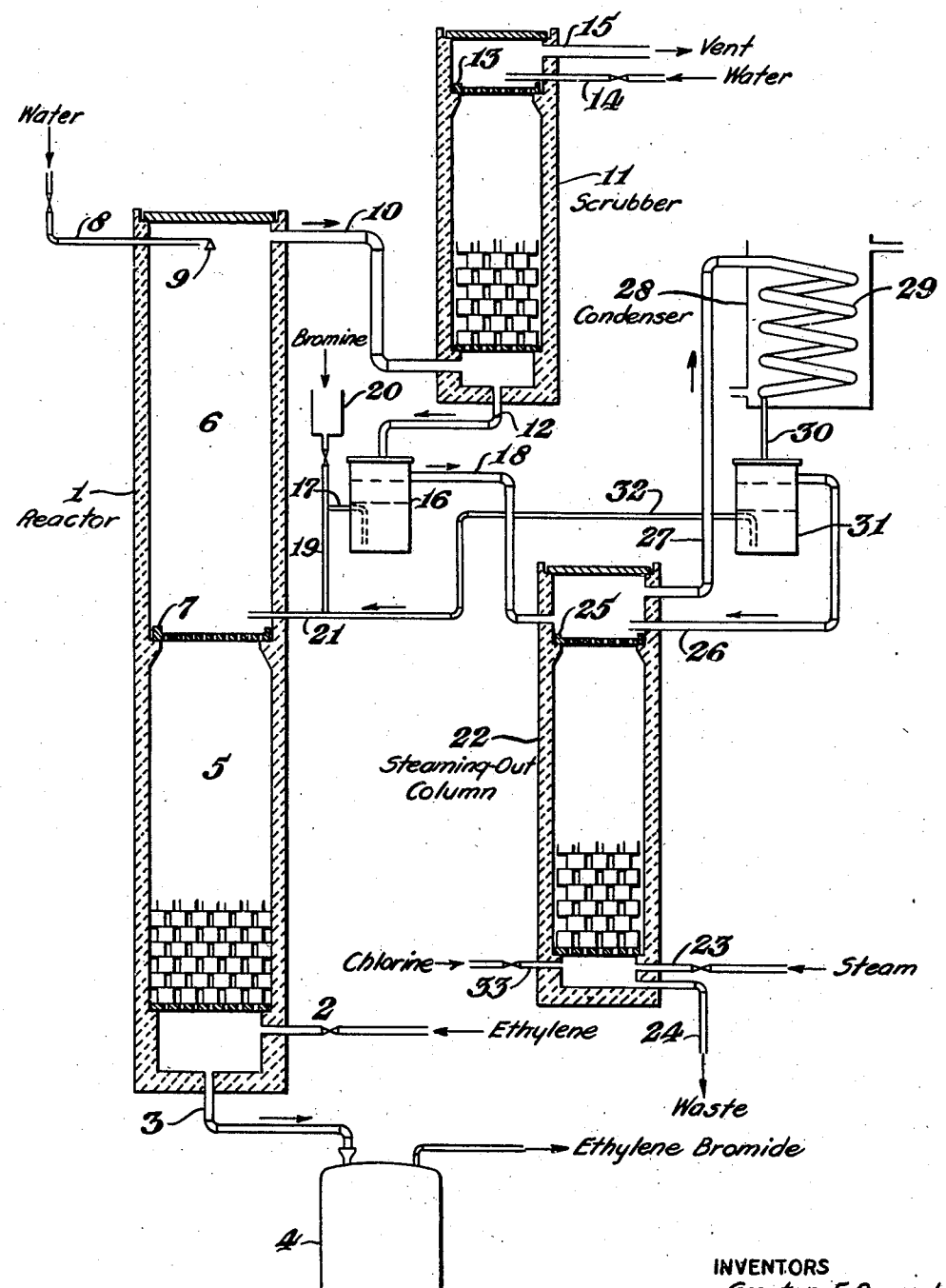

2,108,011

UNITED STATES PATENT OFFICE 2,108,011

PREPARATION OF ETHYLENE BROMIDE

Grayton F. Dressel, Wilmington, N. C., and Charles E. Short, Midland, Mich., assignors to The Dow Chemical Company, Midland, Mich., a corporation of Michigan Application December 30, 1935, Serial No. 56,660

3 Claims. (Cl. 260—166)

The invention relates to a continuous process for making ethylene bromide by direct reaction of ethylene and bromine, and has particular regard to a process in which a more or less dilute ethylene gas may be employed.

The usual procedure for making ethylene bromide has been to pass ethylene into a body of liquid bromine, the mixture being cooled to prevent undue heating of the same by the heat of reaction and loss of bromine by vaporization. This method is slow and has been disadvantageous in certain respects, due in part to the varying rate of reaction while completing a batch. At the beginning the reaction may be slow to start, thus permitting some of the ethylene to pass through the body of liquid bromine without reacting. The reaction rate gradually increases as the reaction proceeds, reaches a maximum and then decreases as the accumulation of ethylene bromide in the mixture outweighs the unreacted bromine therein, so that toward the end of the reaction more or less of the ethylene passes through the mixture unreacted. A considerable loss of ethylene ordinarily occurs both at the beginning and end of the batch process, even when using a strong, nearly 100 per cent gas. When a dilute gas containing ethylene mixed with inert gases is used, the losses are still greater. Unless the ethylene gas is carefully dried before being introduced to the reaction, the moisture content thereof largely condenses in the reactor, and the accumulated water may, and often does, lead to side reactions and the formation of undesirable by-products from which it is difficult to purify the ethylene bromide. Due to the relatively large quantities of materials in process, and the irregularity of the reaction rate, temperature control is difficult, and it frequently happens that the reaction gets out of control, resulting in considerable losses of materials.

It is an object of the present invention to provide a continuous, instead of a batch, method of operation, and particularly one which can be operated successfully with a dilute ethylene gas such as is obtained as a product of cracking hydrocarbon oil. A further object is to carry out the process substantially in vapor phase and at a uniform reaction rate, avoiding the irregularities connected with operation in liquid phase and in batches. Another object is to give a higher yield of ethylene bromide of purer quality. Still another object is to provide an effective control of temperature in the reaction. Other objects and advantages will appear as the description proceeds. The invention, then, consists in the improved method hereinafter fully described in the annexed drawing and following specification, and particularly pointed out in the claims.

In said annexed drawing:—

The single figure is a diagrammatic representation of a combination of apparatus suitable for carrying out the method of the invention.

Referring to the drawing, reactor column 1 consists of a vertical steel shell provided with an acid-resistant lining, having at the bottom an inlet 2 for ethylene and an outlet 3 for reaction product, outlet 3 connecting with a receiver 4. Column 1, in the preferred embodiment as shown, is divided into a lower chamber 5 and an upper chamber 6, of about equal volume. Lower chamber 5 is filled with a body of acid-resistant packing material, such as Raschig rings. Upper chamber 6 has a distributor plate 7 at the bottom, and at the top a water inlet 8 terminating in a spray nozzle 9, and a gas outlet pipe 10, but preferably contains no packing material. Pipe 10 leads to the base of scrubber column 11, which contains a body of packing material, and has a liquid outlet 12 at the bottom, and at the top a distributor 13, a water inlet 14, and a gas vent pipe 15. Pipe 12 connects with the top of separator 16 having one overflow pipe 17 running from near the bottom through the side at a somewhat higher level, and a second overflow pipe 18 near the top. Pipe 17 connects with pipe 19 from bromine feed tank 20, and pipe 19 in turn connects with bromine inlet pipe 21 which enters column 1 near the bottom of upper chamber 6.

Overflow pipe 18 from separator 16 leads to the top of steaming-out column 22, which is likewise filled with packing material. Column 22 has a steam inlet 23, and a waste outlet 24, at the bottom, and at the top a distributor plate 25, a liquid return pipe 26, and a vapor outlet pipe 27. Vapor pipe 27 leads to a condenser 28, which may consist of a pipe coil 29 immersed in a water bath. The discharge pipe 30 from coil 29 connects with the top of a second separator 31, from which the top overflow pipe 26 leads to the top of column 22, as aforesaid, while the side overflow pipe 32 connects with bromine inlet pipe 21 of column 1.

In carrying out our improved method or process, ethylene is admitted to the base of reactor 1 through inlet pipe 2, while liquid bromine is introduced from feed tank 20 through pipes 19 and 21 on to distributor 7 at the bottom of chamber 6. The liquid bromine flows downwardly through the packing in chamber 5 where it meets the ascending flow of ethylene. Reaction of ethylene and bromine commences in chamber 5, heat being evolved which is sufficient, soon after the process is started and continuing thereafter, to vaporize the bromine. Hence, although the reaction is initiated within the body of packing material in chamber 5, the gases and vapors pass upwardly into chamber 6, where the reaction is completed in vapor phase. The rate of feed of ethylene and bromine is regulated so that the temperature within the reaction zone remains below the boiling point of the product, ethylene bromide, i. e. below about 130° C. Accordingly, the ethylene bromide formed condenses in the reaction zone, flows downwardly through the packing in chamber 5, where it comes in contact with the incoming ethylene, which acts upon any bromine dissolved in the ethylene bromide and converts it likewise to ethylene bromide. Thus the countercurrent flow of materials in chamber 5 serves not only to produce the desired conditions for the reaction but also to scrub the product and remove free bromine therefrom. The ethylene bromide substantially free from bromine flows into the base of column 1 and thence through pipe 3 into receiver 4, from which it may be removed as desired.

Any unreacted ethylene and bromine in chamber 6, as well as the inert gases present, pass out through outlet pipe 10. The proportions of ethylene and bromine introduced are controlled so that there shall be a slight excess over the stoichiometrical proportion of bromine, e. g. about 3 to 5 per cent, thereby insuring substantially complete reaction of the ethylene. Such excess of bromine can be recovered by scrubbing with water, as hereinafter described, whereas ethylene in the exit gases would pass through the scrubber and thus be lost in the vent gases. In practice the proper proportioning of ethylene and bromine may be indicated by the color of the exit gases in pipe 10, which can be observed by means of a sight glass or the like.

As an aid to temperature control in the column 1 a limited amount of water may be introduced into chamber 6 through pipe 8 and spray nozzle 9. The evaporation of the water in the reaction zone serves to regulate the rise of temperature therein. The amount of water so used should be controlled to that which is practically all vaporized, so that the ethylene bromide product is obtained substantially free from water.

The exit gases and vapors passing through pipe 10 are conducted to the base of water scrubber 11. These gases contain, besides the inert gases and water vapor, some bromine as well as vapors of ethylene bromide, and also such hydrobromic as may have been formed in the reaction. They are scrubbed by water to condense ethylene bromide vapors, and to absorb bromine and hydrobromic acid. The scrubbed gases, substantially free from bromine, pass out through vent 15.

The wash waters from scrubber 11, containing condensed ethylene bromide and dissolved bromine and hydrobromic acid, flow into separator 16, where they separate by gravity into a lower ethylene bromide layer containing some dissolved bromine, and an upper aqueous layer containing hydrobromic acid and the balance of the bromine. The ethylene bromide layer is drawn off through pipes 17 and 19 and returned to column 1 through pipe 21. The water layer overflows through pipe 18 into the top of steaming-out column 22, wherein it flows downwardly through the body of packing material and is heated by steam introduced at steam inlet 23 at the bottom of the column. In case the wash water contains an appreciable amount of hydrobromic acid, sufficient chlorine can also be admitted at chlorine inlet 33 to liberate the bromine therefrom. The bromine contained in the wash water, along with that, if any, produced by chlorinating hydrobromic acid therein, is steamed out of the solution, and passes together with water vapor through exit pipe 27 to condenser 28, wherein the liquids are condensed and flow thence into separator 31. The condensate separates into two layers, the water layer saturated with bromine being returned to the top of column 22 through pipe 26, while the heavy bromine layer is returned to chamber 6 of column 1 through pipes 32 and 21. The debrominated water from column 22 is drawn off to waste through outlet 24.

The foregoing method of procedure is adapted for use with an ethylene gas varying from substantially 100 per cent to a dilute gas containing as low as 10 per cent of ethylene admixed with inert diluent gases, such as hydrogen, nitrogen, methane, ethane, etc. Due to the countercurrent mode of operation in reaction column 1, with which is combined the scrubbing action of the liquid ethylene bromide product upon the incoming ethylene, substantially quantitative conversion of ethylene to ethylene bromide is accomplished in a continuous manner at a single pass, while a bromine-free product is obtained. The scrubbing of the exit gases and vapors from column 1 recovers the vapors of bromine and ethylene bromide carried along by the inert gases present, and such recovered materials are continuously returned to the reaction, thus practically avoiding losses.

*Example 1*

As an illustrative example, in an apparatus similar to that above described a dilute ethylene gas, containing 45 per cent by weight of ethylene and 55 per cent of inert gases, was passed for 6½ hours at a rate of 0.73 cubic foot per minute into the base of a reactor column, the lower part of which was filled with ⅝ inch pieces of glass packing material. During the same time bromine was introduced above the packing material at a rate sufficient to maintain a slight brownish coloration in the exit gases from the top of the column, a total of 60 pounds of bromine being thus added over the 6½ hour period. The temperature at the bottom of the column was about 16° C., at the top 55° C., and the maximum temperature in the reaction zone was between 100° and 120° C. The exit gases from the top of the column were passed through a water scrubber, the condensed ethylene bromide was returned to the reactor, the wash water was steamed to remove bromine therefrom and the recovered bromine was likewise returned to the reactor. The yield of ethylene bromide, obtained as a colorless liquid, was 69.5 pounds, corresponding to 98.8 per cent of theory, based upon the bromine. The direct product had a specific gravity of 2.185 and a boiling range of 1.3° C. at the boiling point. The bromine lost in the waste water from the steaming-out column was 0.7 per cent, and in the vent gases 0.5 per cent. The ethylene lost in the vent gases was 0.8 per cent.

Example 2

Similarly, using a gas mixture containing 19 per cent of ethylene, 37.8 pounds of bromine were reacted in 8 hours, during which time the temperature in the actual reaction zone of the reactor varied between 60° and 64° C. The yield of ethylene bromide was 92.2 per cent, based upon the bromine used, and 98 per cent, based upon the ethylene.

Example 3

In another example run in the same apparatus, using a gas containing 93 per cent of ethylene, passed at a rate of 0.715 cubic foot per minute for 6 hours, and 99.56 pounds of bromine, the vapor temperature in the reaction zone was controlled at 52° to 55° C. by adding water to the reactor at the rate of 200 drops per minute. The yield of ethylene bromide was 97.6 per cent, based upon the bromine used, and 99.9 per cent, based upon the ethylene.

According to our improved method, ethylene bromide can be made continuously in high yield with respect to both the bromine and ethylene used, the product being obtained directly in substantially pure state, and by-products caused by side reactions being practically absent. The method is adapted for use with either a strong or dilute ethylene gas, and has an advantage over previous methods in that a dilute gas can be used without excessive losses by vaporization. By carrying out the reaction largely in the vapor phase a uniform reaction rate is maintained, and material variations in reaction temperature are avoided.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. A continuous method of making ethylene bromide which comprises introducing liquid bromine into a reactor wherein it is intimately contacted with a stream of ethylene-containing gas free from other reactive components, such bromine being slightly in excess of the stoichiometrical proportion to the ethylene in the gas, whereby reaction occurs with evolution of heat, regulating the rate of introduction of bromine and ethylene so as to maintain the temperature in the reaction zone above the boiling point of bromine but below the boiling point of ethylene bromide, whereby the reaction proceeds substantially in vapor phase while the ethylene bromide formed flows as liquid from the reaction zone, and passing such outflowing ethylene bromide in counter-current to the incoming stream of ethylene-containing gas to convert any residual free bromine dissolved in such liquid to ethylene bromide by reaction with such ethylene.

2. The method as defined in claim 1, in which the unreacted vapors and inert gases are continuously withdrawn from the reaction zone and scrubbed with water to recover vapors of bromine and ethylene bromide therefrom, such recovered materials being separated from the water and returned to the reaction zone.

3. The method as defined in claim 1, in which a limited amount of water is introduced into the reaction zone, not in excess of an amount which is vaporized by the heat of reaction therein, whereby to facilitate the control of reaction temperature within the stated limits.

GRAYTON F. DRESSEL.
CHARLES E. SHORT.